United States Patent
Song

(10) Patent No.: US 9,484,780 B2
(45) Date of Patent: Nov. 1, 2016

(54) SEGMENTED ARMATURE MOTOR HAVING A SEGMENTED COIL FRAME HAVING COIL WINDINGS ON THE OUTER SURFACE

(76) Inventor: Kil Bong Song, Seoul (KR)

( * ) Notice: Subject to any disclaimer, the term of this patent is extended or adjusted under 35 U.S.C. 154(b) by 523 days.

(21) Appl. No.: 13/811,747

(22) PCT Filed: Jul. 26, 2011

(86) PCT No.: PCT/KR2011/005483
§ 371 (c)(1),
(2), (4) Date: Jan. 23, 2013

(87) PCT Pub. No.: WO2012/015209
PCT Pub. Date: Feb. 2, 2012

(65) Prior Publication Data
US 2013/0119815 A1 May 16, 2013

(30) Foreign Application Priority Data
Jul. 27, 2010 (KR) .......................... 10-2010-0072357

(51) Int. Cl.
*H02K 3/04* (2006.01)
*H02K 1/27* (2006.01)
*H02K 3/18* (2006.01)
*H02K 3/47* (2006.01)
(Continued)

(52) U.S. Cl.
CPC .............. *H02K 3/04* (2013.01); *H02K 1/2773* (2013.01); *H02K 3/18* (2013.01); *H02K 3/47* (2013.01); *H02K 3/522* (2013.01); *H02K 21/12* (2013.01)

(58) Field of Classification Search
CPC ........ H02K 1/2773; H02K 3/04; H02K 3/18; H02K 3/47; H02K 3/522; H02K 5/18

USPC .................. 310/86, 89, 164, 179, 180, 208, 310/216.002, 216.004, 216.007
See application file for complete search history.

(56) References Cited

U.S. PATENT DOCUMENTS

| | | | | |
|---|---|---|---|---|
| 3,191,081 A | * | 6/1965 | Faulhaber | H02K 23/56 310/154.04 |
| 3,209,187 A | * | 9/1965 | Angele | H02K 3/26 310/154.23 |
| 3,360,668 A | * | 12/1967 | Faulhaber | H02K 3/04 29/596 |
| 4,103,196 A | * | 7/1978 | Saito | H02K 3/04 310/154.04 |

(Continued)

FOREIGN PATENT DOCUMENTS

| | | |
|---|---|---|
| CN | 1324510 A | 11/2011 |
| JP | 09-507640 | 7/1997 |

(Continued)

OTHER PUBLICATIONS

International Search Report dated Mar. 14, 2012, corresponding to PCT/KR2011/005483.

*Primary Examiner* — Terrance Kenerly
*Assistant Examiner* — Rashad Johnson
(74) *Attorney, Agent, or Firm* — Revolution IP, PLLC

(57) ABSTRACT

Provided is a segmented armature motor, which includes a plurality of armature coils which enclose a rotor having a rotary shaft, an armature which houses the armature coil and which is coupled in a segmented form, a motor frame which is coupled to the armature so as to enclose the armature, and motor covers coupled to the front and rear faces of the motor frame. The segmented armature motor is formed so that the armature coils completely enclose a pole portion of the rotor and are formed into a horseshoe shape or U shape, thereby minimizing magnetic losses of the armature and of the rotor.

10 Claims, 10 Drawing Sheets

(51) Int. Cl.
*H02K 3/52* (2006.01)
*H02K 21/12* (2006.01)

(56) References Cited

U.S. PATENT DOCUMENTS

| | | | | |
|---|---|---|---|---|
| 4,110,901 A | * | 9/1978 | Nakamura | H02K 3/04 |
| | | | | 29/598 |
| 4,556,811 A | * | 12/1985 | Hendricks | H02K 3/04 |
| | | | | 310/208 |
| 4,968,911 A | * | 11/1990 | Denk | 310/216.007 |
| 5,767,596 A | * | 6/1998 | Stark et al. | 310/89 |
| 5,798,591 A | * | 8/1998 | Lillington et al. | 310/164 |
| 6,351,052 B1 | * | 2/2002 | Kim | 310/179 |
| 8,084,909 B2 | * | 12/2011 | Goodzeit | H02K 55/00 |
| | | | | 310/112 |
| 2004/0119356 A1 | * | 6/2004 | Anwander | H02K 1/2773 |
| | | | | 310/156.55 |
| 2004/0164638 A1 | * | 8/2004 | Asaba | 310/208 |
| 2008/0143200 A1 | * | 6/2008 | Kalsi | H02K 1/12 |
| | | | | 310/58 |
| 2008/0278020 A1 | * | 11/2008 | Ley | H02K 1/148 |
| | | | | 310/156.36 |

FOREIGN PATENT DOCUMENTS

| | | |
|---|---|---|
| JP | H09-507640 A | 7/1997 |
| JP | 2002-529035 A | 9/2002 |
| JP | 2003-264947 | 9/2003 |
| JP | 2008-199691 | 8/2008 |
| KR | 20-1999-0023364 | 7/1999 |
| KR | 10-2009-0003577 | 1/2009 |

* cited by examiner

SEGMENTED ARMATURE MOTOR HAVING A SEGMENTED COIL FRAME HAVING COIL WINDINGS ON THE OUTER SURFACE

TECHNICAL FIELD

The present invention relates to a segmented armature motor and, more particularly, to a segmented armature motor whose armature coil and rotor are improved in configuration so as to be able to increase efficiency thereof.

BACKGROUND ART

In general, a synchronous motor refers to a constant speed motor (a kind of an alternating current motor) that rotates at a constant frequency at a constant speed (synchronous speed) regardless of a load. This synchronous motor is typically configured with 3-phase windings arranged to form a rotating magnetic field on a stator and magnets (permanent magnets or electromagnets) embedded to form magnetic poles (N and S poles) in a rotor having a laminated structure of core members (iron cores).

The synchronous motor as described above is generally driven by the rotating magnetic field generated between the stator and the rotor. The synchronous motor having this driving method typically has a characteristic of rotating at a speed that is proportional to a frequency of supply voltage applied to the 3-phase windings and is inversely proportional to the number of magnetic poles of the rotor, i.e., at a speed that is synchronized with a frequency of input voltage.

However, since electromagnetic force acts on only one corresponding face, a conventional motor or generator requires the iron core that is a passage of strong electromagnetic force, and is reduced in efficiency due to a loss of the lines of electromagnetic force applied to the iron core.

DISCLOSURE

Technical Problem

Accordingly, the present invention has been made keeping in mind the above problems occurring in the related art, and an object of the present invention is to provide a segmented armature motor that is formed so that armature coils completely enclose a pole portion of the rotor and are formed into a horseshoe shape or U shape, thereby minimizing magnetic losses of the armature and of the rotor.

Technical Solution

According to an aspect of the present invention, there is provided a segmented armature motor, which includes: a plurality of armature coils enclosing a rotor having a rotary shaft; an armature housing the armature coils and coupled in a segmented form; a motor frame coupled with the armature so as to enclose the armature; and motor covers coupled to front and rear faces of the motor frame.

Here, each armature coil may be formed in a hollow shape, be bent from one or opposite ends of an intermediate portion thereof, and include armature coil terminals on one side thereof.

Further, the segmented armature motor may further include a coil frame that is coupled in a segmented form between the armature coils and the rotor and that includes support slots formed at intervals and coil frame support walls formed slantingly.

Further, the armature may be made up of an armature frame having an armature cable and armature covers coupled to front and rear faces of the armature frame, and a dielectric sheet may be mounted between the coil frame and the armature frame.

In addition, permanent magnets constituting the rotor may be configured so that N and S poles thereof are disposed in a rotating direction of the rotor, and so that the neighboring ones thereof are disposed so as to have repulsive poles.

Advantageous Effects

According to the present invention, the segmented armature motor is formed so that the armature coils completely enclose a pole portion of the rotor and are formed into a horseshoe shape or U shape, thereby making it possible to minimize magnetic losses of the armature and of the rotor.

Further, the armature coils enclose a great part of field poles. In the case of a motor, the magnetic flux generated from the armature is concentrated on the center and thus increases efficiency of rotation of the field poles. In the case of a generator, the magnetic flux generated from the armature is linked with the armature coils with no loss of the magnetic flux generated from the field poles and thus increases efficiency of the generator.

MODE FOR INVENTION

Figure 1:
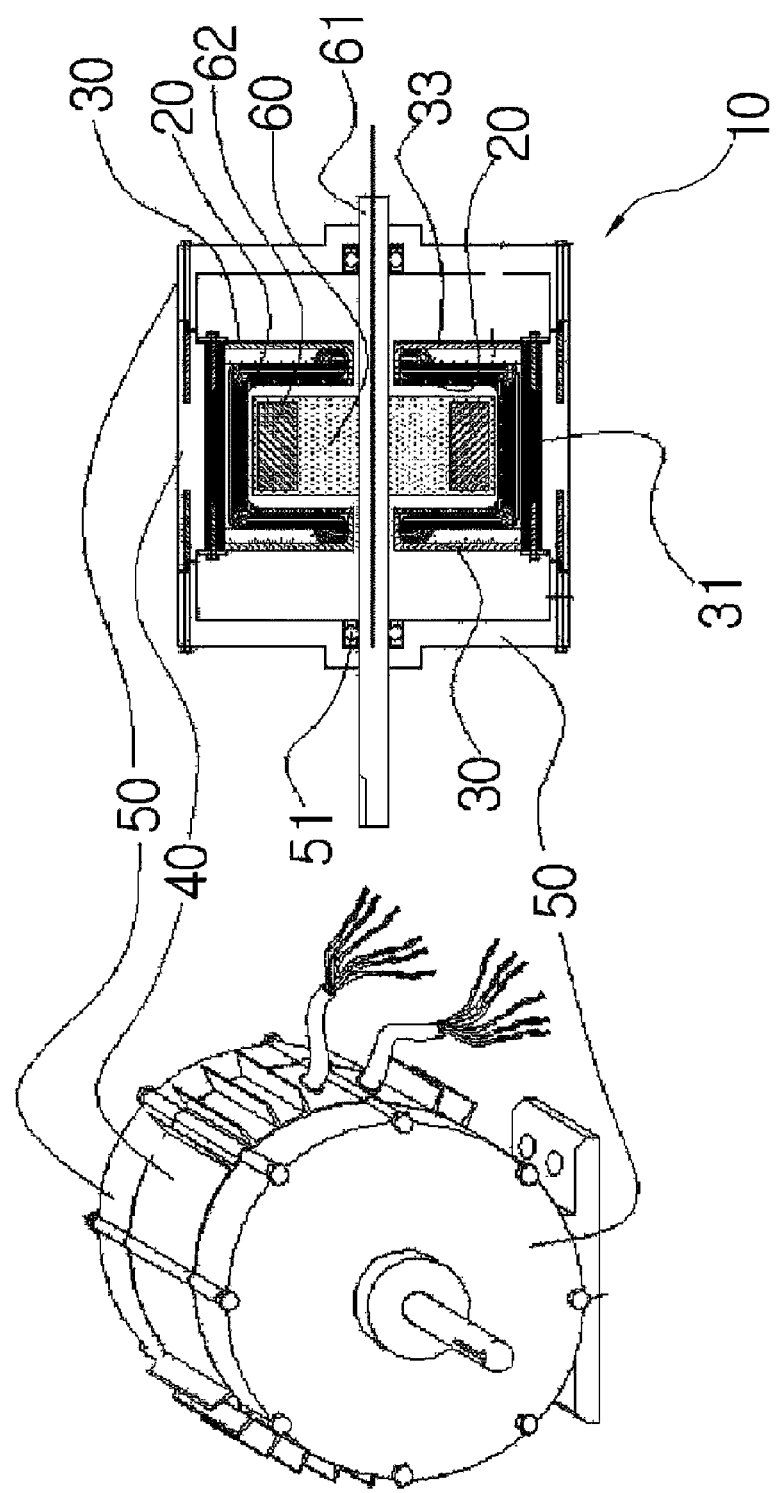
FIG. 1 is a view showing a segmented armature motor according to an embodiment of the present invention.
Figure 2:
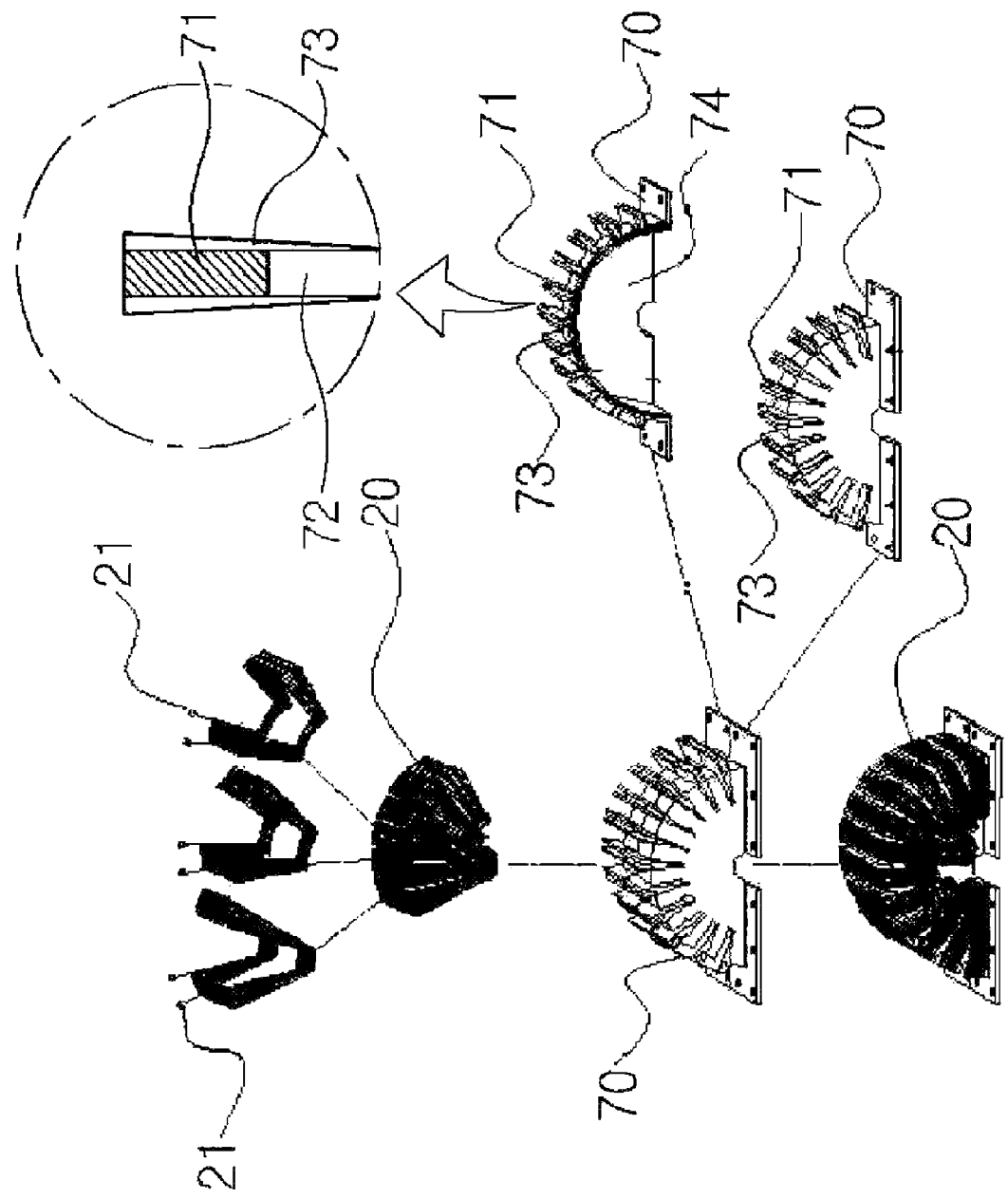
FIGS. 2 to 4 are perspective views showing a process of assembling the segmented armature motor according to the embodiment of the present invention.
Figure 3:
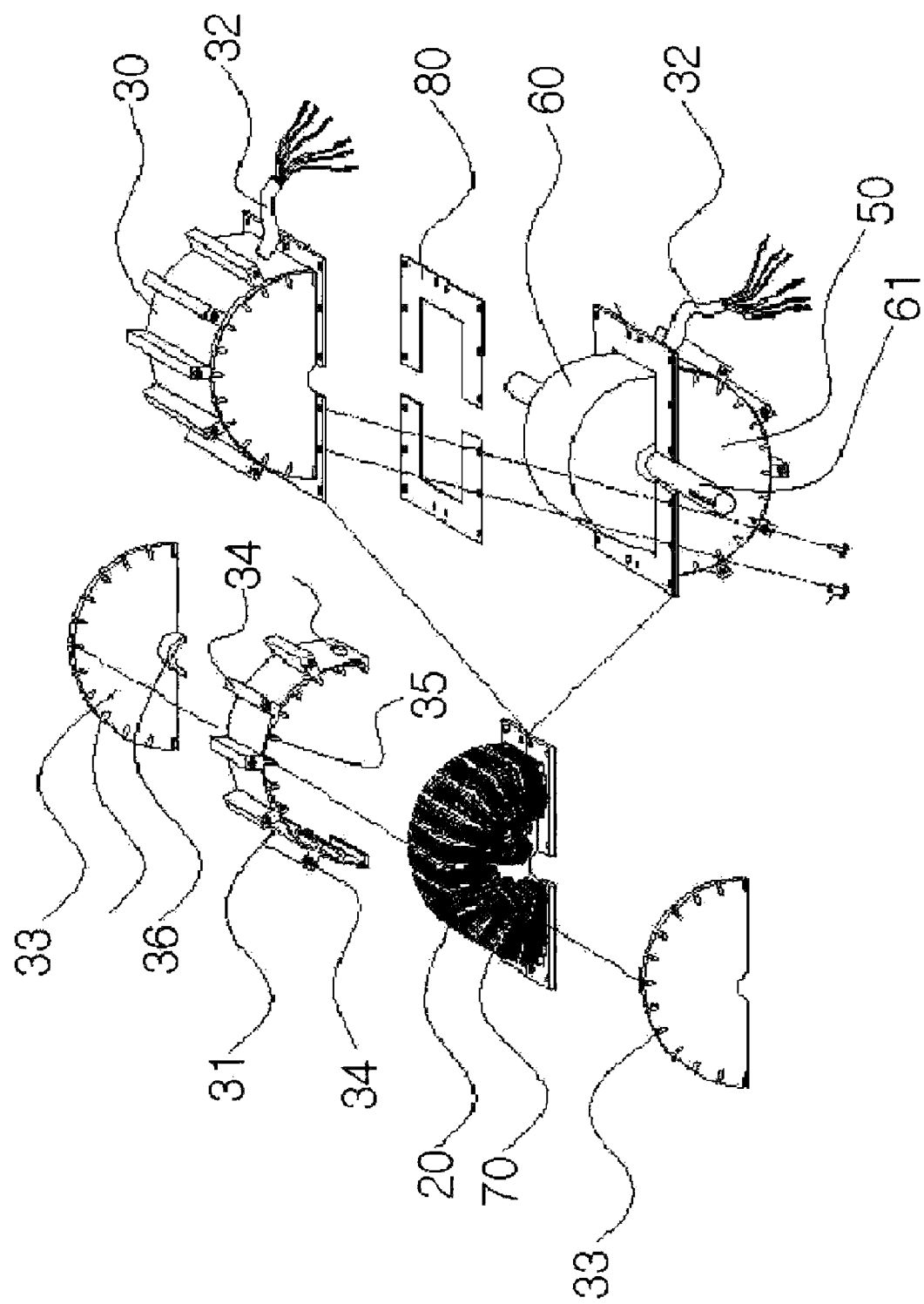
Figure 4:
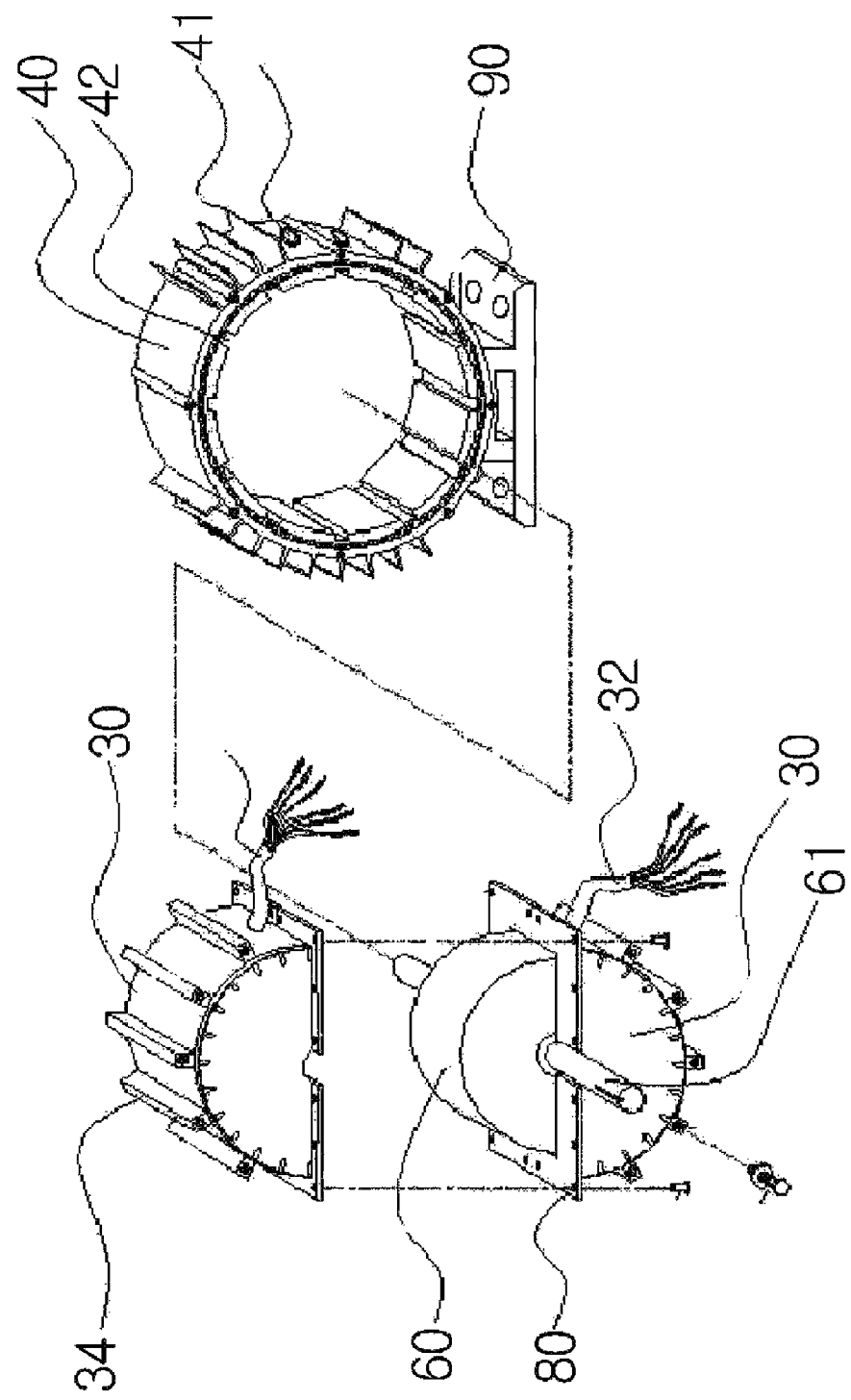
Figure 5:
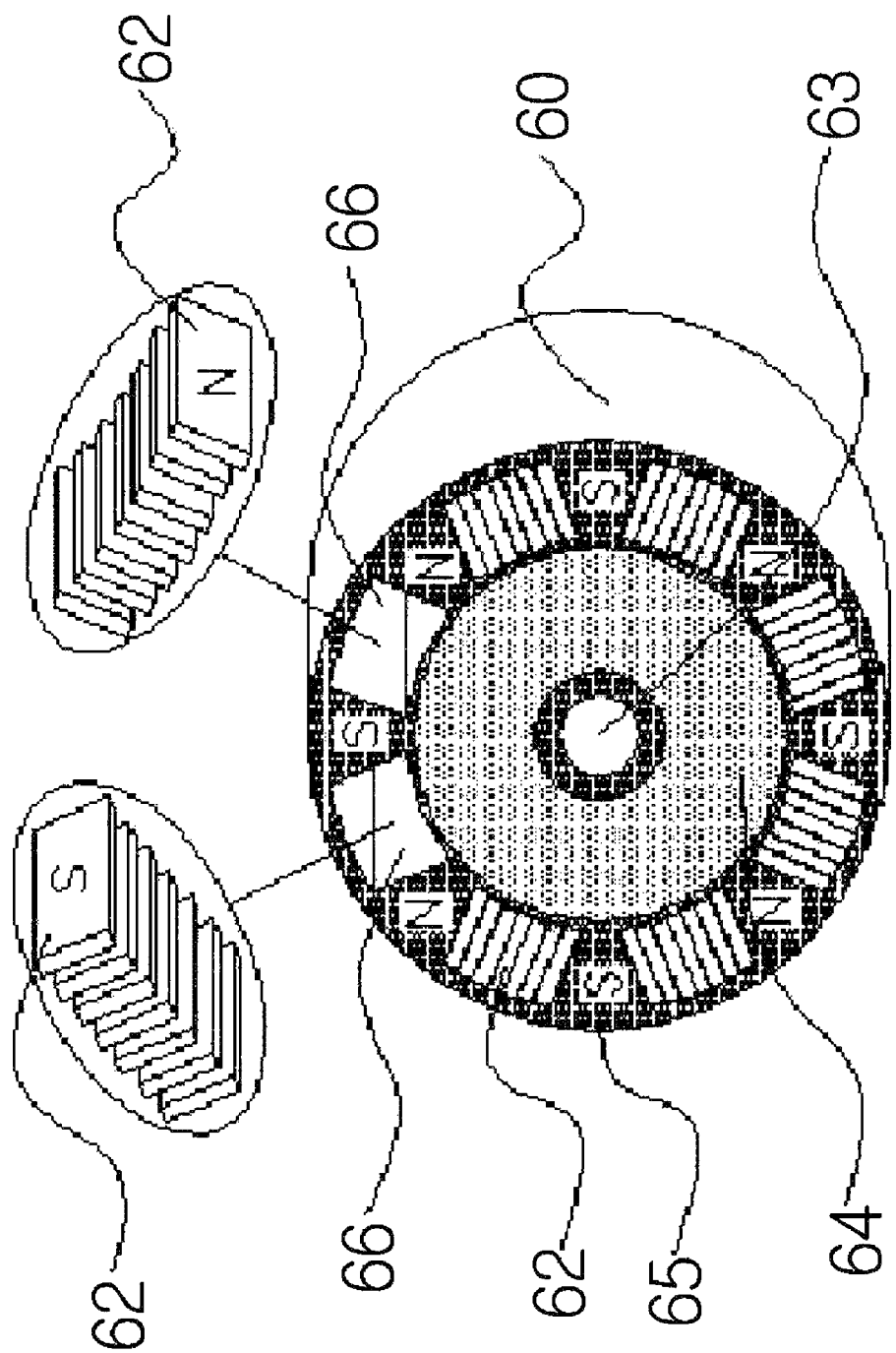
FIG. 5 is a cross-sectional view showing a rotor constituting the segmented armature motor according to the embodiment of the present invention.

Hereinafter, embodiments of the present invention will be described with reference to the accompanying drawings. FIG. 1 is a view showing a segmented armature motor according to an embodiment of the present invention. FIGS. 2 to 4 are perspective views showing a process of assembling the segmented armature motor according to the embodiment of the present invention. FIG. 5 is a cross-sectional view showing a rotor constituting the segmented armature motor according to the embodiment of the present invention.

A segmented armature motor 10 according to an embodiment of the present invention includes a plurality of armature coils 20 enclosing a rotor 60 having a rotary shaft 61, an armature 30 housing the armature coils 20 and coupled in a segmented form, a motor frame 40 coupled with the armature 30 so as to enclose the armature 30, motor covers 50 coupled to front and rear faces of the motor frame 40, and a coil frame 70 mounted between the armature coils 20 and the rotor 60.

Each armature coil 20 is formed in a hollow shape, is bent from one or opposite ends of an intermediate portion thereof, and is provided with armature coil terminals 21 on one side thereof.

In detail, each armature coil 20 is formed in a hollow shape such as a horseshoe shape or a U shape, and has armature coil terminals 21 mounted on one side thereof.

In greater detail, each armature coil 20 is shaped so as to enclose the coil frame 70 to be described below, and is formed in a double horseshoe or U shape by bending a circular or quadrangular coil on opposite sides thereof at constant intervals. Each armature coil is installed so as to enclose an outer circumference and opposite sides of the rotor in three directions. Typically, the armature coils 20 are installed in units of a multiple of 3, and are distinguished into front and rear portions in an order in which each is in contact with the rotor 60.

For example, when two magnetic poles of the rotor are N and S poles, three armature coils are installed in such a manner that the front portions thereof are located in turn at positions where a region of the N pole is divided into three equal parts, and that the rear portions thereof are also located in turn at positions where a region of the S pole is divided into three equal parts. This installing method is repeated.

The armature coils 20 are coupled as unit coils, and the armature coil terminals 21 are formed on each armature coil, and are connected based on an armature circuit configuration.

Here, when a set of the overall armature coils 20 are configured of an armature coil circuit corresponding to two field poles (N and S), this becomes a two-pole motor. When the set of the overall armature coils 20 are configured of an armature coil circuit corresponding to four field poles (N, S, N and S), this becomes a four-pole motor.

Moreover, the coil frame 70 mounted between the armature coils 20 and the rotor 60 is segmented, and is provided with an internal space 74 so as to house the rotor 60.

In detail, the coil frame 70 is formed in two so as to be easily assembled. Flanges of the segmented coil frames are formed so as to be easily coupled and positioned in such a way that one thereof is formed with coupling holes and that the other is formed with coupling protrusions.

An outer surface of the coil frame 70 is provided with coil frame partitions 71, each of which has support slots 72 at intervals and a coil frame support wall 73 slantingly formed on one or opposite sides thereof.

Thus, each armature coil 20 is fixed using the support slots 72 and the support wall(s) 73 of each coil frame partition 71.

The armature 30, which houses the armature coils 20 and is coupled in a segmented form, is made up of an armature frame 31 having an armature cable 32 and armature covers 33 coupled to front and rear faces of the armature frame 31.

An outer surface of the armature frame 31 is provided with armature frame fixtures 34 protruding at intervals.

In detail, the armature frame 31 houses the armature coils 20 and the coil frame 70, which are coupled to each other. The armature frame 31 is configured so that frame supports 35 protruding from an inner surface thereof are fixedly inserted into the coil frame partitions 71 constituting the coil frame 70. Then, the armature covers 33 are coupled to the armature frame 31. The other armature frame 31 is fixedly coupled in the process above.

Here, the armature covers 33 are each provided with an extension 36 so as to be able to prevent the armature coils 20 from being exposed. A dielectric sheet 80 is mounted between the coil frame 70 and the armature frame 31.

The motor frame 40 enclosing the armature 30 is provided with motor frame cooling fins 41 protruding from an outer surface thereof at intervals for cooling the armatures, and motor frame insertion grooves 42 formed in an inner surface thereof at intervals.

That is, the motor frame 40 is configured so that the armature 30 of the rotor 60 is inserted into the motor frame insertion grooves 42 formed in the inner surface thereof. Here, the motor frame 40 may be selectively provided with a pedestal 90 on the outer surface thereof so as to be able to stably support the motor frame 40.

In the embodiment, an example in which the motor frame 40 is formed in a cylindrical shape will be described.

Motor covers 50 coupled to front and rear faces of the motor frame 40 are formed in a shape corresponding to that of the motor frame 40. Bearings 51 are mounted on portions of the motor covers 50 through which the rotary shaft 61 of the rotor 60 passes. The motor covers 50 are bolted to the motor frame 40.

That is, the motor covers 50 are coupled to the motor frame 40 to which the armature coils 20, the coil frame 70, the armature 30, and the rotor 60 are coupled.

The rotor 60 mounted in the coil frame 70 is formed of a non-magnetic conductor, and is provided with a rotor hole 63 for the rotary shaft 61 in the inner center thereof. An inner cylinder 64 of the rotor can be reduced in density by a process, and an outer cylinder 65 of the rotor is provided with magnet holes 66 into which permanent magnets 62 can be inserted.

In the embodiment, the permanent magnets 62 are configured so that N and S poles thereof are disposed in a rotating direction of the rotor, and so that the neighboring ones thereof are disposed so as to have repulsive poles, i.e. the same poles.

Here, as each permanent magnet 62, a laminated permanent magnet of flat magnets or a monolithic permanent magnet is used.

Figure 6:
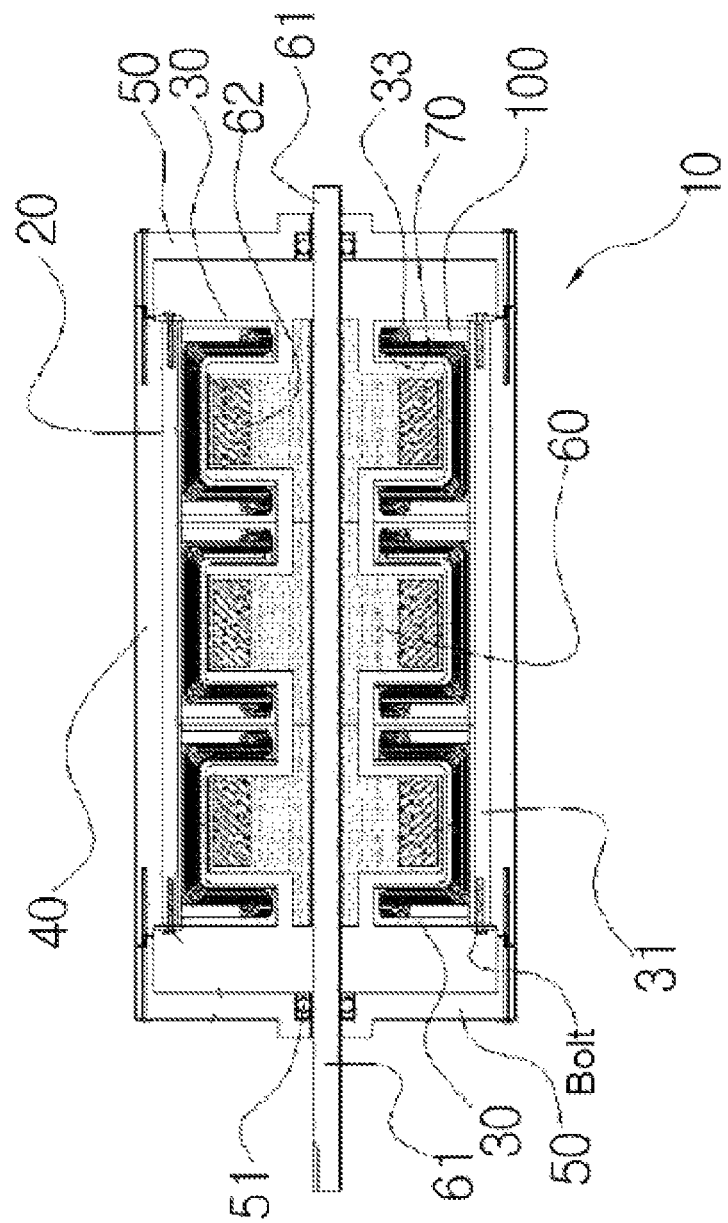
FIG. 6 is a cross-sectional view showing a segmented armature motor according to another embodiment of the present invention.
Figure 7:
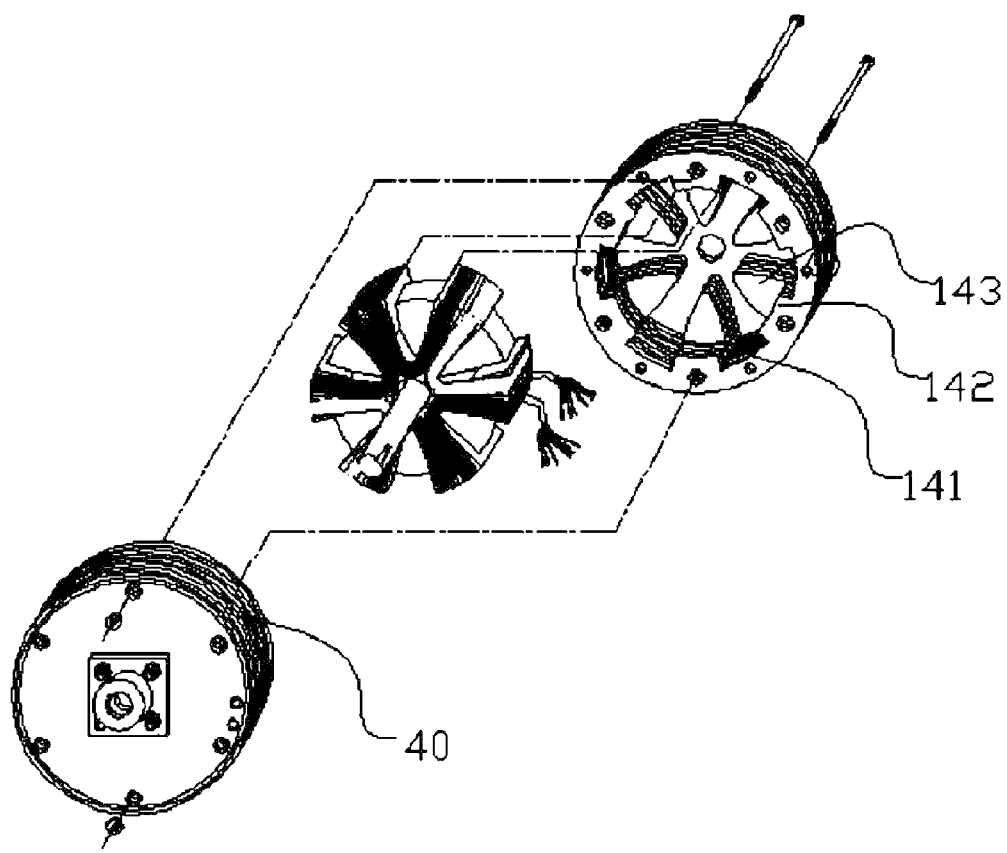
FIGS. 7 and 8 are disassembled and assembled perspective views showing a segmented armature motor according to yet another embodiment of the present invention.
Figure 8:
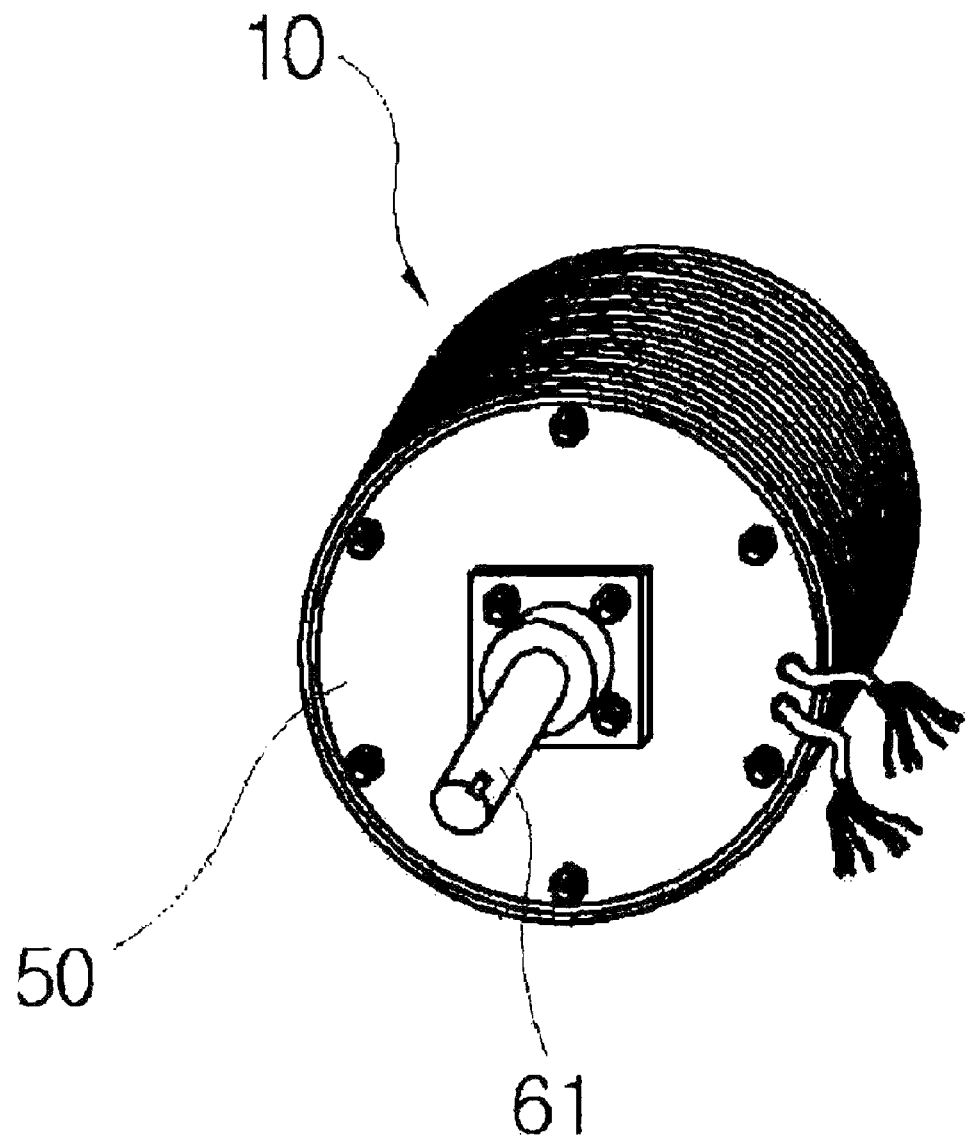
Figure 9:
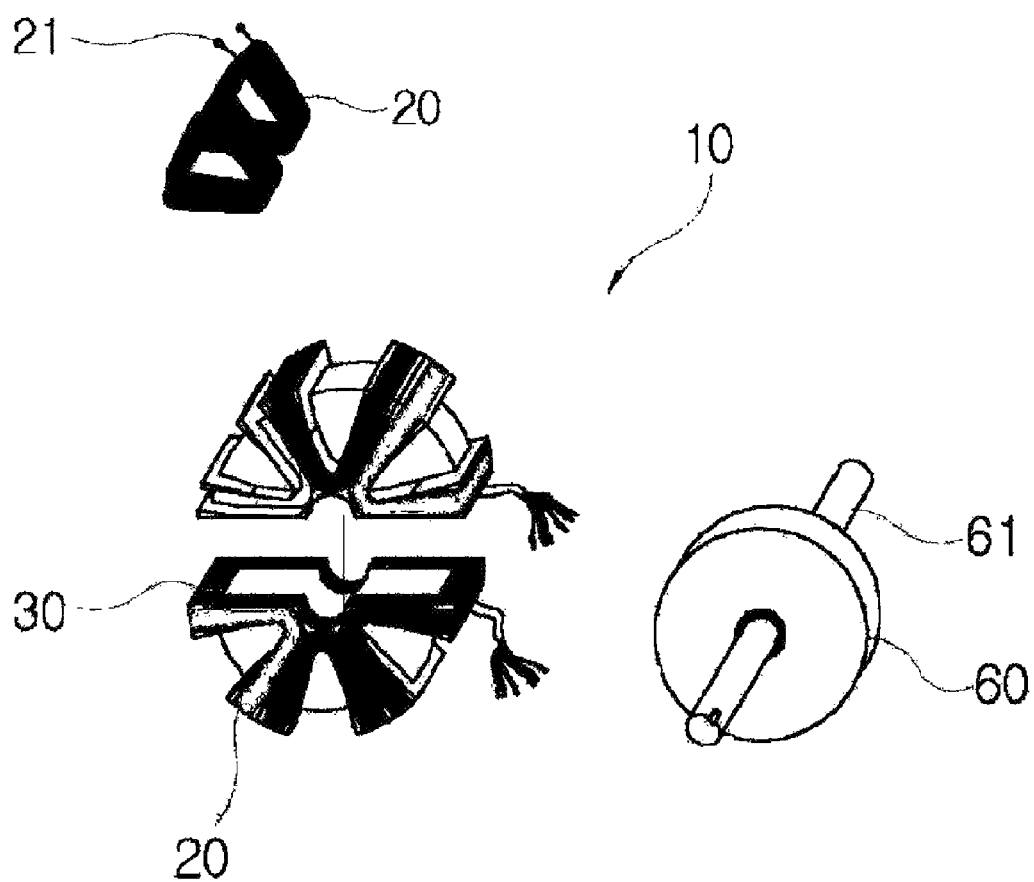
FIGS. 9 and 10 are perspective views showing a process of assembling the segmented armature motor according to the other embodiment of the present invention.
Figure 10:
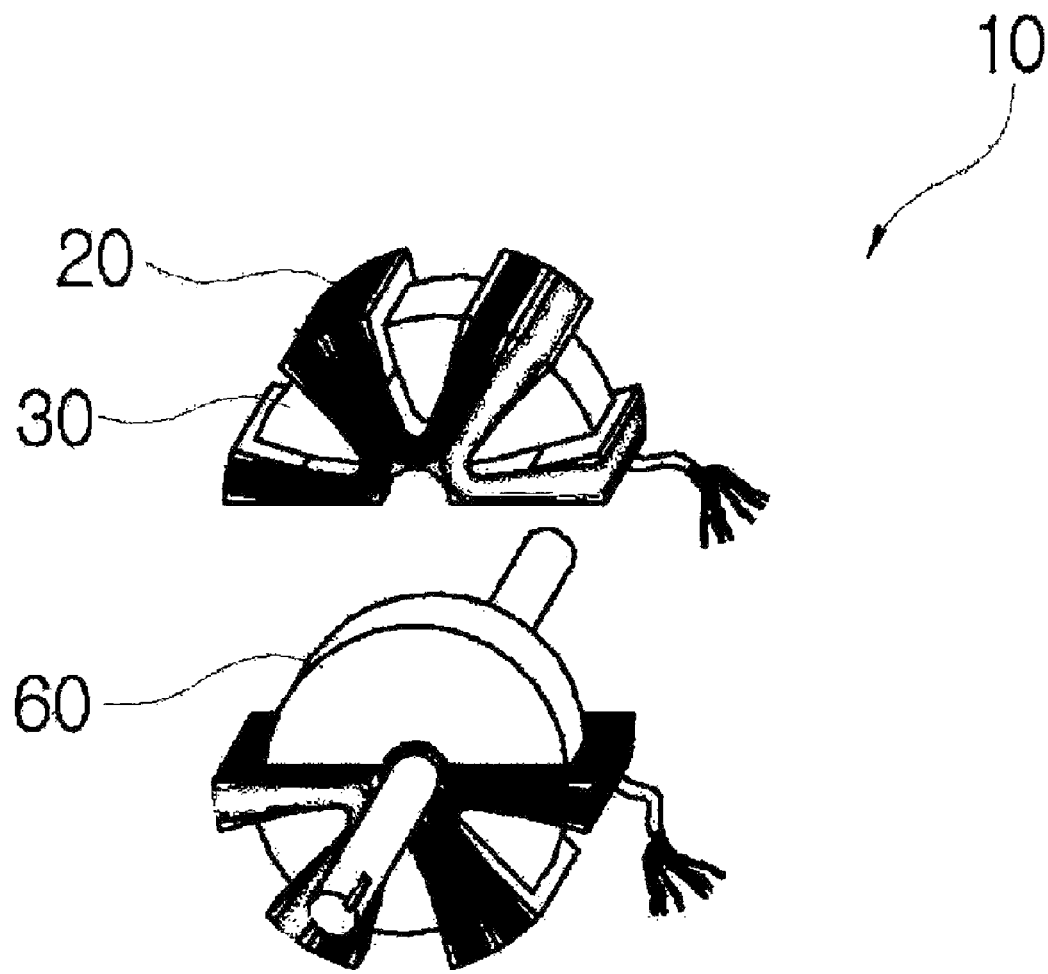

Next, FIG. 6 shows a segmented armature motor 10 according to another embodiment of the present invention. The segmented armature motor 10 is configured so that permanent magnets 62 are fixed so as to be able to rotate along with each rotor 60 to which a rotary shaft 61 is fixed, so that an armature frame 31 is fitted to a coil frame 70 with armature coils 20 installed and is covered with armature covers 33, and so that a filler 100 is inserted into a space between the armature frame and each armature cover and fixes the armature coils 20.

In a state in which segmented armatures 30 are engaged with each other, a motor frame 40 is fixed using fixing bolts. The rotary shaft 61 is coupled inside the armature 30, and the rotor 60 equipped with the permanent magnets 62 is rotatably installed.

Next, motor covers 50 having bearings 51 are fixed to the motor frame 40 using assembling bolts. It is shown that a plurality of motor drivers are installed in one motor frame 40.

Next, FIGS. 7 to 10 show a segmented armature motor according to yet another embodiment of the present invention. The segmented armature motor 10 includes a plurality of armature coils 20, an armature 30 housing the armature coils 20 and coupled in a segmented form, a motor frame 40 coupled with the armature 30 so as to enclose the armature 30, and motor covers 50 coupled to front and rear faces of the motor frame 40.

In the segmented armature motor 10, the armature 30 is integrally formed with a coil frame 70.

Each armature coil 20 is configured to be bent in a horseshoe or U shape at predetermined intervals and to enclose the rotor 60, and is installed on the coil frame 70 so as to be the segmented armatures 30.

The rotor 60 to which the rotary shaft 61 is coupled is inserted inside the segmented coil frames 70. The coil frames coupled with the rotor 60 are coupled with the motor frame 40. The motor frame 40 is segmented into two parts which are inserted at opposite sides of the rotary shaft 61. Each part of the motor frame 40 is configured to have coil recesses 141 into which the armature coils 20 are inserted so as to be in close contact according to a shape of each armature 30, first protrusions 142 fitted into circumferential spaces of the armature coils 20, and second protrusions 143 inserted into lateral spaces of the armature coils 20.

Further, the coil recesses 141, the first protrusions 142, and the second protrusions 143 of the motor frame 40 may be formed by laminating a plurality of iron core sheets.

A process of assembling the segmented armature motor configured as described above will be described.

First, the coil frame 70 is formed in two so as to have the internal space 74 formed therein and the coil frame partitions 71 formed on the outer surface thereof. Each of the coil frame partitions 71 has the support slots 72 formed at intervals and the coil frame support wall 73 slantingly formed on one or opposite sides thereof.

The armature coils 20 are mounted between the coil frame partitions 71. Each armature coil 20 is formed in a hollow shape such as a horseshoe or U shape, and is mounted with the armature coil terminals 21 on one side thereof.

Next, the rotor 60, which is formed of a non-magnetic conductor and has the rotary shaft 61 mounted in the inner center thereof and the magnet holes 66 formed in the outer cylinder 65 thereof so that the permanent magnets 62 can be inserted, is mounted in the internal space 74 of one coil frame 70, and then the coil frames 70 are coupled.

The armature 30 is formed so as to have the armature frame 31 equipped with the armature cable 32, the armature covers 33 coupled to the front and rear faces of the armature frame 31, the armature frame fixtures 34 protruding from the outer surface of the armature frame 31 at intervals, and the frame supports 35 protruding from the inner surface of the armature frame 31 at intervals, and then an assembly of the armature coil 20, the rotor 60, and the coil frame 70 is mounted in the armature 30.

In detail, the armature frame 31 houses the armature coils 20 and the coil frame 70, which are coupled to each other. The armature frame 31 is configured so that the frame supports 35 protruding from the inner surface thereof are fixedly inserted into the coil frame partitions 71 constituting the coil frame 70. Then, the armature covers 33 are coupled to the armature frame 31. The other armature frame 31 is fixedly coupled in the process above.

Next, the armature 30 is inserted into the motor frame 40 that has the motor frame cooling fins 41 protruding from the outer surface thereof at intervals for cooling the armatures and the motor frame insertion grooves 42 formed in the inner surface thereof at intervals. Then, the motor covers 50 are mounted in the front and rear of the motor frame 40. Thereby, the process of assembling the segmented armature motor 10 is completed.

Here, the assembly sequence of the segmented armature motor 10 may be different from the aforementioned sequence.

While the segmented armature motor of the present invention has been described on the basis of a specific shape and direction with reference to the attached drawings, it will be appreciated by those skilled in the art that various modifications, additions, and substitutions are possible and should be interpreted to fall into the scope and spirit of the present invention as disclosed in the accompanying claims.

The invention claimed is:

1. A segmented armature motor comprising: an armature having a plurality of frame supports formed protruding inward directions and frame fixtures formed protruding outward directions at intervals: a coil frame having a plurality of paired-coil frame support walls and coil frame partitions formed at intervals, the coil frame partitions being formed between inside of each paired-coil frame support walls, and the coil frame partitions being gradually widened in a radial outward direction based on the paired-coil frame support walls, each which are slantingly formed in a radial outward direction based on the coil frame, the coil frame comprising a first coil frame and a second coil frame, each of the first and second coil frame being formed as symmetrical hemisphere; a rotor inserted into the coil frame and having a rotary shaft; a paired dielectric sheet is mounted between the first and second coil frame; and a plurality of armature coils formed at each of the coil frame partitions of the coil frame, wherein each of the plurality of paired-coil frame support walls is inserted between the plurality of frame supports, wherein each of the plurality of armature coils is formed in such a way that an interval thereof is as gradually widened in a radial outward direction on each of the coil frame partitions of the coil frame.

2. The segmented armature motor according to claim 1, wherein the rotor includes permanent magnets whose N and S poles are disposed in a rotating direction of the rotor.

3. The segmented armature motor according to claim 2, wherein the permanent magnets are configured so that the neighboring ones thereof are disposed so as to have repulsive poles.

4. The segmented armature motor according to claim 1, wherein the coil frame is segmented into upper and lower coil frames having a semi-circular cross section, and the upper and lower coil frames are assembled so as to face each other.

5. The segmented armature motor according to claim 4, wherein an armature is made up of the armature coils that are installed on an outer circumference of each of the upper and lower coil frames, and of the rotor installed in the upper and lower coil frames.

6. The segmented armature motor according to claim 5, further comprising a motor frame enclosing the armature.

7. The segmented armature motor according to claim 6, wherein the motor frame is formed in a shape of a cylinder segmented into two left-hand and right-hand parts that are assembled with the armature inserted thereinto.

8. The segmented armature motor according to claim 6, wherein the motor frame has a shape corresponding to the armature so as to allow the armature to be inserted thereinto, and includes coil recesses, first protrusions, and second protrusions formed therein.

9. The segmented armature motor according to claim 6, wherein the motor frame is formed by laminating a plurality of iron core sheets.

10. A segmented armature motor comprising: an armature having a plurality of frame supports formed protruding inward directions and a frame fixtures formed protruding outward directions at intervals: a coil frame having a plurality of paired-coil frame support walls and coil frame partitions formed at intervals, the coil frame partitions being formed between inside of each paired-coil frame support walls, and the coil frame partitions being gradually widened in a radial outward direction based on the paired-coil frame support walls, each which are slantingly formed in a radial outward direction based on the coil frame, the coil frame comprising a first coil frame and a second coil frame, each of the first and second coil frame being formed as symmetrical hemisphere a rotor inserted into the coil frame and having a rotary shaft; a paired dielectric sheet is mounted between the first and second coil frame; and a plurality of armature coils formed at each of the coil frame partitions of the coil frame, wherein each armature coil is formed in a hollow shape, is bent at each of the coil frame partitions of the coil frame, and is formed in a horseshoe or U shape, wherein each of the coil frame partitions has support slots at intervals and each of the paired-coil frame support walls is slantingly formed on both sides of in a radial outward direction based on the coil frame, each of the plurality of paired-coil frame support walls is inserted between the plurality of frame supports, each of the plurality of armature coils is installed so as to enclose an outer circumference and opposite sides of the rotor in three directions, where regions of N and S poles are divided into three equal parts, and wherein each of the plurality of armature coil is formed as gradually widened in a radial outward direction on each of the coil frame partitions side of the coil frame.

* * * * *